United States Patent

[11] 3,528,401

| [72] | Inventor | Herbert L. Moore<br>4507 N. Magnolia, Chicago, Illinois 60640 |
|---|---|---|
| [21] | Appl. No. | 581,274 |
| [22] | Filed | Sept. 22, 1966 |
| [45] | Patented | Sept. 15, 1970 |

[54] COOKING UTENSIL
2 Claims, 4 Drawing Figs.

[52] U.S. Cl. ............................................ 126/369, 126/381
[51] Int. Cl. .............................................. A47j 27/06
[50] Field of Search ...................................... 99/100, 413, 415, 171H; 126/381, 377, 373, 385, 369

[56] References Cited
UNITED STATES PATENTS

| 776,025 | 11/1904 | Hillman ....................... | 126/377 |
| 930,389 | 8/1909 | Kleinfelder .................. | 126/377 |
| 1,003,112 | 9/1911 | Johnson ....................... | 126/377 |
| 2,123,359 | 7/1938 | Hallmark ...................... | 126/376 |
| 2,546,104 | 3/1951 | MacGregor .................. | 126/377 |
| 2,622,591 | 12/1952 | Bramberry ................... | 126/381 |
| 3,040,735 | 6/1962 | Lyon ............................ | 126/376 |

FOREIGN PATENTS

| 127,742 | 6/1918 | Great Britain ............. | 126/377 |

Primary Examiner—Frederick L. Matteson, Jr.
Assistant Examiner—Robert A. Dua
Attorney—Fidler, Bradley, Patnaude and Lazo ABSTRACT: A cooking utensil includes a bottom pan, a cover and an intermediate pan which fits between the bottom pan and the cover. The intermediate pan includes a depressed food supporting portion and a flange portion which extends beyond the lip of the bottom pan to serve as a handle and which has a downwardly and inwardly sloping perforated portion.

Patented Sept. 15, 1970

Inventor
Herbert L. Moore
By
Agent

Patented Sept. 15, 1970

Inventor
Herbert L. Moore
By
J. D. Holmes
Agent

COOKING UTENSIL

My present invention relates generally to improvements in cooking utensils.

More specifically, the invention is directed to a cooking pan for supporting food while sealingly fitting intermediately between a bottom pan and cover of conventional cooking utensils, such as skillets and the like, whereby food can be cooked partially by conduction of heat through the intermediate pan and partially by condensation of water vapor on the food.

The apparatus of the invention is characterized by permitting latitude of selection between the extent to which certain foods are cooked by conduction of heat with relationship to the extent the food is cooked by direct condensation of water vapor upon the food. Hence the moisture content of the food is controllable to some extent as to the amount of moisture inherent in the food and the amount of vapor that condenses on the food, which condensate comprises distilled water that will not adversely affect the natural flavor of the food.

In practicing this invention, the rate of input of heat to the utensil is controlled, and only a small amount of water is needed in the bottom pan. At a low rate of heat input, only a small amount of water vapor will be generated, and substantially all of such vapor will condense on the bottom of the intermediate pan containing the food to be cooked and heat will be conducted to same. Hence, the food will cook as in a double-boiler, and the flavor of the food will not be leached. At a high rate of heat input, water vapor is generated more copiously, a lesser relative amount will condense on the bottom of the intermediate pan, and more vapor will condense directly on the food.

The food will cook more rapidly in the manner of cooking in a steam-cooker, and the flavor of the food can be leached to a desired extent.

In addition to the above recited advantages, different foods can be cooked in different portions or compartments of the utensil without the flavor of one food adversely affecting the flavor of another. By way of example only, ham has been boiled in the skillet while eggs were cooked in the intermediate pan without affecting the flavor of either. Different vegetables, such as potatoes, peas, carrots, etc. have also been cooked simultaneously, with ham present in the skillet below, and the ham and vegetables each retained their distinctive flavors.

Another object is to provide improvements in cooking utensils such as skillets and the like.

A further object, in keeping with each of the preceeding objects, is to provide an intermediate cooking pan for sealingly fitting between a skillet or the like and a cover therefor.

Other objects and advantages of the invention reside in the arrangement of parts and details of construction of the utensil, and will be either obvious to those skilled in the art or pointed out in the following specification and claims read in view of the accompanying drawings, in which:

Figure 1:
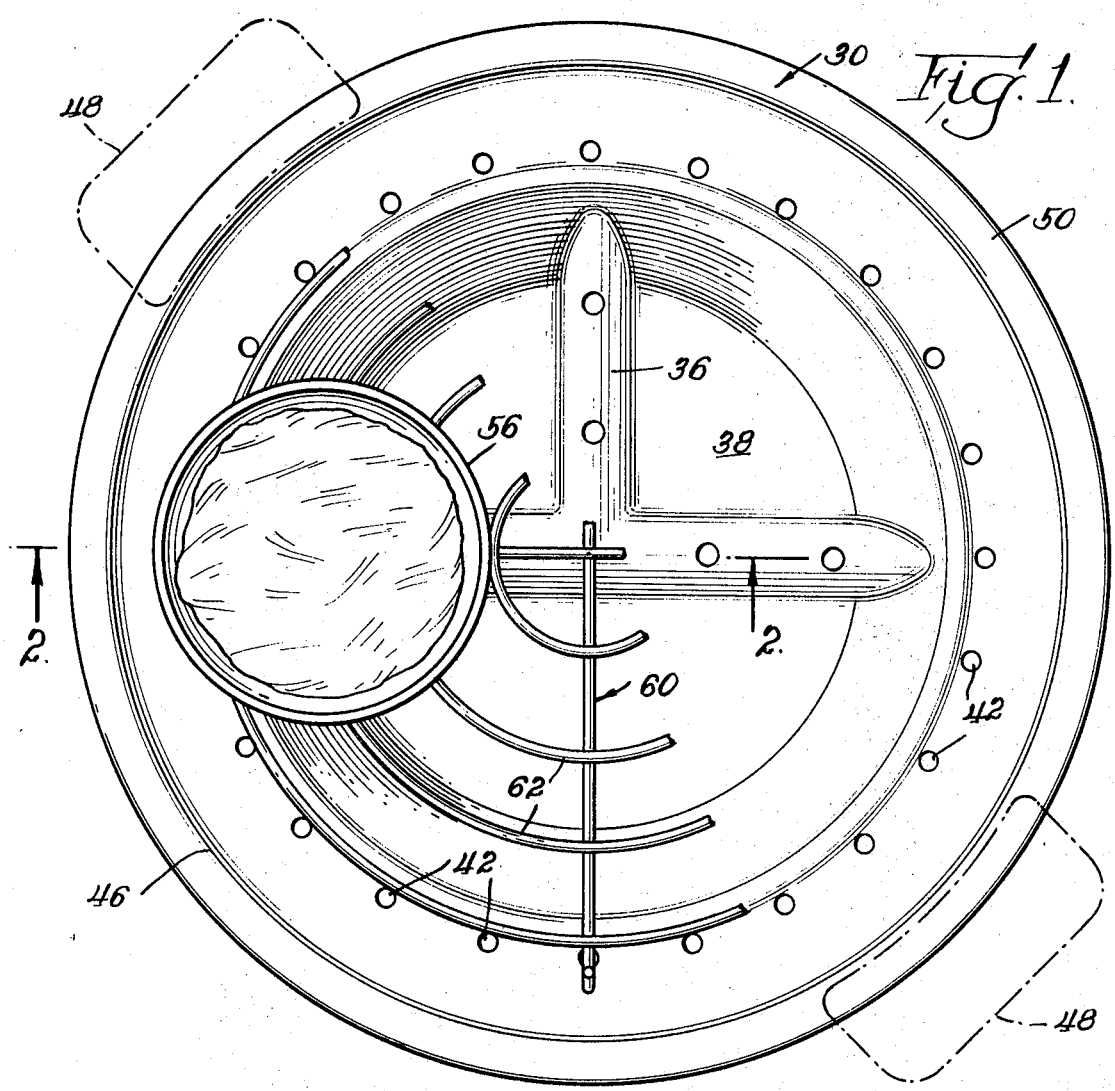
FIG. 1 is a plan view of a cooking utensil of the present invention with the cover removed.
Figure 2:
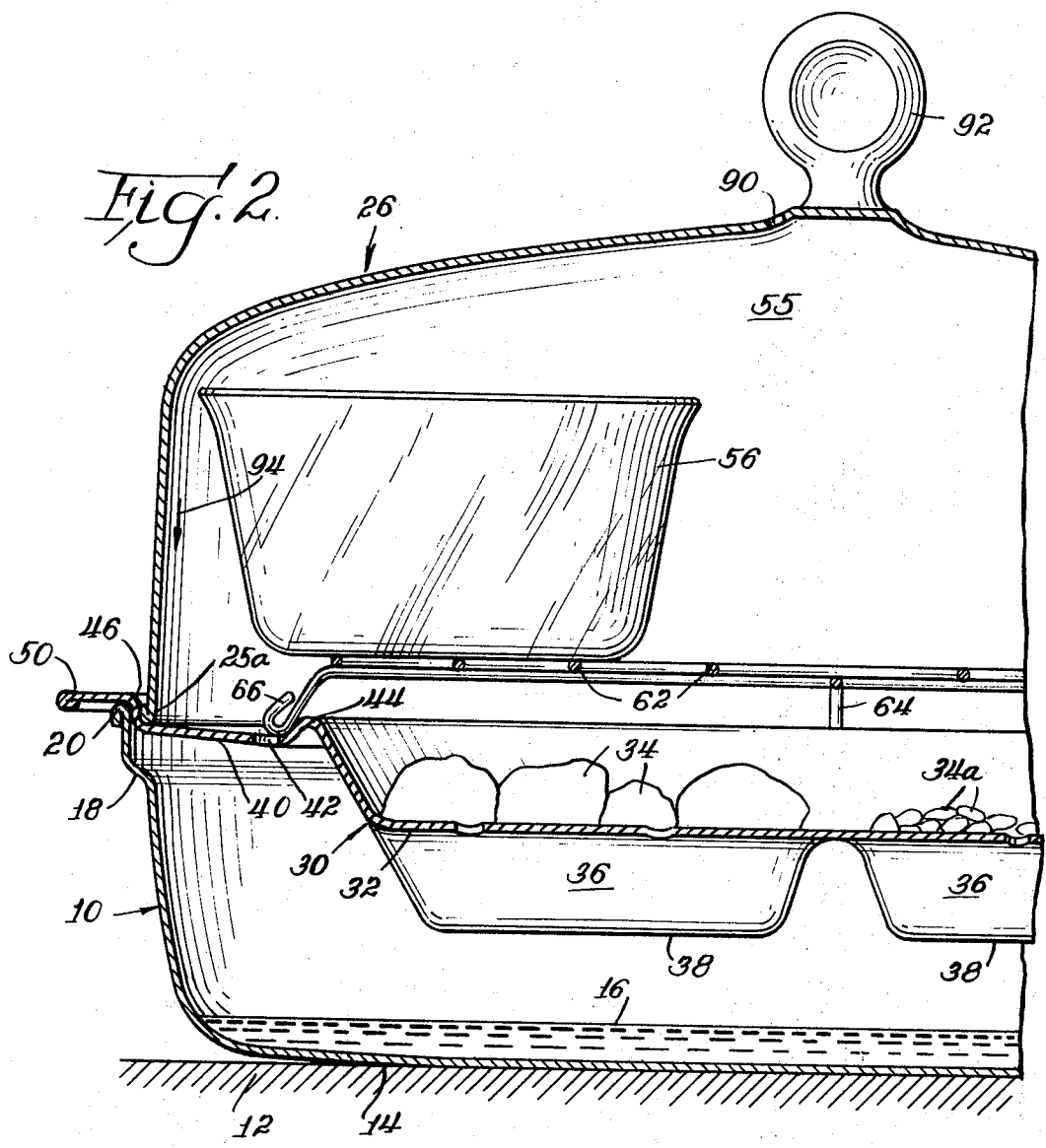
FIG. 2 is a sectional view taken generally along lines 2—2 of FIG. 1.

Referring now to the drawings for details of the invention, and first to FIGS. 1 and 2, a bottom pan or skillet 10, FIG. 2, is adapted to rest upon a heating surface 12, such as a burner, from which heat is transferred through a bottom surface 14 of the pan 10 to articles to be cooked within the pan 10. The pan 10 is of present commercial manufacture and can be used to boil, fry and saute foods in conventional manner. For the purpose of practicing the present invention, a small body of water 16 is normally contained within the bottom pan 10. Water vapor is generated from the water 16, in a manner to be described in connection with the method of operation, and the water is adapted to cook vegetables and the like in a manner to be described hereinafter.

Figure 3:
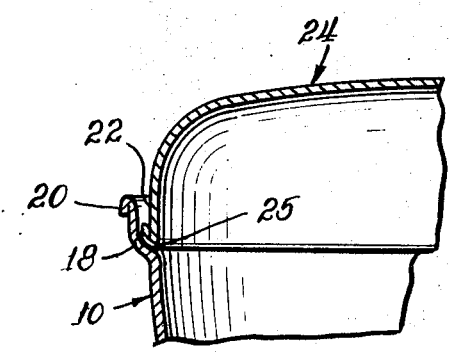
FIG. 3 is a view of a small section of an edge of a conventional cooking utensil.

With reference to FIG. 3, showing a portion of a commercially available skillet, the bottom pan 10 is provided with an upper shoulder 18 sloped to provide an upper lip 20, which normally sealingly cooperates with a lower edge 22 of a cover generally indicated at 24. The cover, in ordinary utensils, is of relatively shallow construction. The lower edge 22 of the cover 24, in several presently available utensils, has a lower edge 25 which sealingly engages the internal surface of the shoulder 18 to effectively seal the cover adjacent said surface to provide for containing water vapor within the utensil to facilitate cooking in conventionally known manner.

Referring again to FIGS. 1 and 2, the present invention can use a rather shallow dome cover 24, or a high dome cover 26 indicated generally in FIG. 2. The high dome cover 26, or the low dome cover 24 of FIG. 3, are equipped with lower edges 25 and 25a which are adapted to sealingly engage the inner surfaces of flange 18 generally in the manner indicated in the drawing, and all of such structure is known in the art to which the present invention pertains.

The present invention is more particularly directed to an intermediate pan 30, and mechanical accoutrements cooperable therewith for providing apparatus availing a new method of cooking. As illustrated in FIG. 1 the intermediate pan 30 has a depressed central portion 32 adapted to support food 34 for the purpose of cooking same upon the depressed portion 32. The depressed portion 32 may be generally flat, or as shown in FIGS. 1 and 2 may contain ribs 36 which are upstanding from the bottom 38 of the intermediate pan 30 to separate different portions of food 34 and different kinds of foods generally indicated at 34a. As many ribs 36 may be utilized as desirable in practicing this invention, and as shown, three compartments are divided by the transverse ribs 36.

The intermediate pan 30 is provided with a perimetrical flange 40 lying generally above the plane of the bottom surface 38, and as shown, in FIG. 2, above the top surfaces 32 of the ribs 36. The flange 40 is tapered downwardly and inwardly all around the pan 30 and is provided with a series of holes 42 adjacent a perimetrical ridge 44 for a purpose to be described hereinbelow in connection with the method of operation of the invention.

Figure 4:
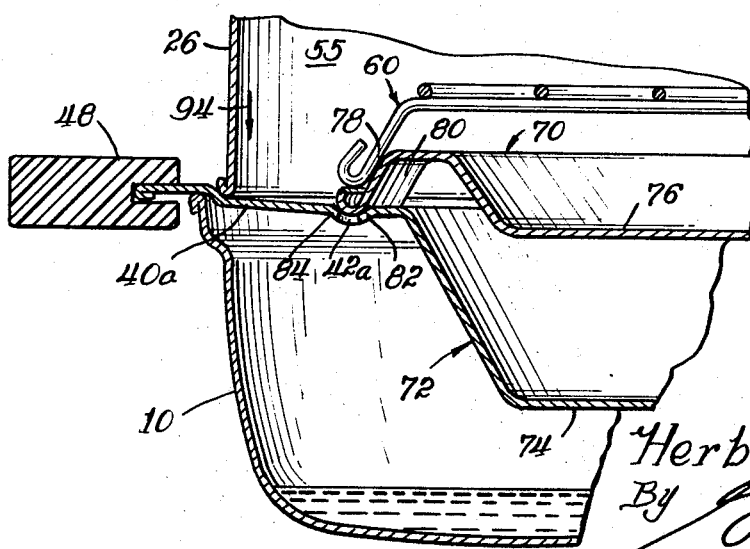
FIG. 4 is a partial view, generally similar to FIG. 2, but showing a modification of the present invention.

At the distal end of the flange 40 there is a perimetrical lip 46 which is adapted on its outer surface to sealingly engage the internal surface of the lip 20 of the pan 10, and on its inner surface to sealingly engage the external surface of the bottom edge 25a of the cover 26. As shown in FIGS. 1 and 4, heat insulating handles 48 can be suitably attached to an external flange 50 extending beyond the marginal lip 46 of the intermediate pan 30. With such construction and arrangement, the upper lip 20 of the bottom pan 10, the marginal lip 46 of the perimetrical flange 40 of the intermediate pan 30, and the lower edge 25a (or the lower edge 25 of the modification shown in FIG. 3) will sealingly conjoin the cover 26, the intermediate plan 30 and the bottom pan 10 to facilitate the method to be described hereinbelow.

In addition to cooking vegetables 34 and 34a, and the like, the present invention permits cooking meats and vegetables in the lower pan as well as providing cooking of custards and the like in an upper chamber 55 below the high dome cover 26, which custards, etc., can be contained in individual serving cups, such as a custard cup 56 indicated in FIGS. 1 and 2. In addition to this, a grid 60, provided for supporting the custard cups 56, can alternately support an extra pan of vegetables such as carrots and potatoes for example, the pan being placed upon support wires 62 connected to legs 64 completing the grid. The grid 60 is preferably arranged by having the down-turned legs 64 provided with return bends 66, one being shown in FIG. 2, which return bends cooperate with the external perimetery of the ridge 44 to centrally locate and retain the grid 60.

With reference to FIG. 4, a secondary intermediate pan 70 can also be used in connection with an intermediate pan 72, generally similar to the intermediate pan 30 of FIGS. 1 and 2, except for having a flat bottom providing greater clearance for food in the intermediate pan. The secondary intermediate pan 70 may be provided with ribs on the flat bottom surface 76 for supporting additional food to be cooked as in the manner described above. With the secondary pan 76 in use, the grid 60 is adapted to engage a downwardly extending external flange 78 of the intermediate pan 70, which flange 78 is in turn provided with legs 80 for engaging an outward facing sloped surface 82 of a depression 84 in a perimetrical flange 40a of the intermediate pan 72, which is otherwise identical to the pan described in connection with FIG. 2, except for having, optionally, a flat bottom and the depressed groove 84 rather than the raised flange 44 for providing for drainage of condensate from the top of the utensil down to the bottom thereof. The depressed groove 84 has holes 42a therein generally identical to the holes 42 of FIGS. 1 and 2.

METHOD OF COOKING

In practicing this invention, different methods of cooking can be utilized and certain of them may prove more suitable for cooking certain food articles. In some methods of cooking only a very little heat is required to effectively cook the food to be cooked while preventing leaching of the flavor thereof by condensing an excessive amount of water vapor upon the food to be cooked. In many foods, it is desirable to cook same in the presence of a greater amount of water, and the present invention accommodates such cooking also. Further, in addition, a combination of two kinds of cooking can obtain from inherent features of the invention by suitably treating the food to be cooked so as to render same more highly heat conductive whereby, in early stages of cooking, only a small amount of water vapor tends to condense upon the chilled food; whereas in later stages of cooking a greater amount of water vapor will condense thereon, or at least be subjected to present intimate heat transfer relationship with the food in a manner to be disclosed hereinbelow.

In the slow rate of cooking, the vegetables 34, 34a and the like, are preferably rather finely chopped or comminuted and a low rate of heat is provided at the surface 12, such as an electric element in a self contained electrical cooker or from a burner on a gas or electric stove, or other suitable source of heat. With heat provided at a low rate of heat input, a small amount of water vapor will be generated from the body of water 16 and such water vapor will tend to condense on lower surfaces 32, 38 of FIGS. 1 and 2 and surface 74 FIG. 4. Inasmuch as the food is normally substantially below the temperature of the water vapor, the vapor will condense in very large part upon such bottom surfaces and drip downwardly back into the body of water 16, wherein to be evaporated and recondensed as the temperature of the foods 34 and 34a gradually rise. With the rate of heat input controlled at a relatively low value, or even lower as the time for cooking foods 34 and 34a transpires, the foods 34 and 34a can be cooked to completion with relatively little leaching of flavor thereof by the presence of water vapor present above the intermediate cooking utensils 30 or 72, FIGS. 2 and 4.

During such time, the air within the cover 55 is expanded due to heat and can pass outwardly in large part through a suitable vent 90 indicated in the upper wall of the cover 26, shown adjacent a handle 92. Accordingly, at such time the vegetables 34 and 34a will be subjected to warm air, but at a lower density of same whereby drying out of the vegetables can further be controlled. As the vegetables 34 and 34a become nearer to the temperature of the water vapor, the vapor will pass upwardly through perforations 42 into the upper chamber 55 under the cover 26 and further tend to drive air out of the vent 90. It is to be understood that such vent 90 is optional, and that the apparatus will work in generally the same manner by causing water vapor to displace air in the chamber 55 whereby to preserve natural moisture in the food article 34 and 34a during such low temperature mode of cooking to avail more savor to the finally cooked food articles.

For a higher rate of cooking, or for cooking vegetables that require more heat to cook same, a higher rate of heat input can be provided in the heat surface 12 whereby to cause more rapid evaporation of the water 16 and a higher rate of production of water vapor therefrom. As pointed out above, the first water vapor tends to condense most rapidly on the closest article, which are the bottom surfaces 32, 38 and 74, mentioned above, which transfer heat to the foods 34 and 34a. At such time, the rate of condensation upon these lower surfaces may not exceed, or may be equal to, the rate of generation of water vapor from the water 16 in the bottom pan 10. However, as the temperature of the food 34 and 34a rises, this rate of condensation will decrease and hence more hot water vapor will pass upwardly through perforations 42 into the upper chamber 55.

Water vapor passing upwardly through perforations 42 will condense on chilled surfaces such as the inner surface of the cover 26. Initially such condensate will form at points closest to the inner surface of the cover 26 and will tend to drain back in the direction of an arrow 94 FIGS. 2 and 4 downwardly along this inner surface and upon the sloped surfaces 40 and 40a, FIGS. 2 and 4, thus downwardly through perforations 42 and 42a of the intermediate pans 30 and 72. Thus at such intermediate stage of cooking, an excessive rate of condensation directly upon the foods 34 and 34a is largely inhibited.

In keeping with this invention, and in accordance with the desideratum of the cook using the present utensil, different foods can be arranged for selective cooking on the intermediate pans 30 and 72, also on the grids 60, and in addition, upon the secondary intermediate pan 76 illustrated in FIG. 4. By way of example, and not in a restricting sense, foods that cook more slowly can be placed in the lowermost pans 30 and 72, foods that cook at a secondary rate can be placed upon the grid 60 in either modification of the invention, foods that cook at still a slower rate can be cooked upon a secondary intermediate pan 76, and custards and the like can be cooked within custard cups such as cups 56 indicated in FIGS. 1 and 2. The present advantages of this invention are gained without depriving a conventional cooking utensil of the skillet type of its characteristics of cooking foods of several kinds in well known manner in such skillets; but avails a new method of cooking for providing a multi-course meal for one or more individuals, depending upon the size of the utensil in use.

While I have shown and described in detail preferred modifications of the present invention, obviously other modifications thereof will occur to others working in the art in view of the present disclosure. For this reason it is desired not to be limited in this invention only to the specific embodiments shown and described, but by the spirit and scope of the following claims.

I claim:

1. A cooking utensil including a bottom pan for containing water and having an upper lip, a cover for sealingly fitting said upper lip, an intermediate pan for sealingly fitting between said bottom pan and said cover, said intermediate pan comprising:

A depressed central portion for containing food to be cooked; and a downward inwardly sloping perimentrical flange lying generally in a plane above said central portion, said flange including:

an integral external portion extending beyond said upper lip and adapted to be grapsed to remove said intermediate pan from said bottom pan;

a lip arranged to sealingly fit both said upper lip and said cover;

a plurality of perforations for permitting flow of hot water vapor upward therethrough to facilitate cooking said food and to permit gravitational flow of condensate from said cover to move along said sloping flange and through said perforations into said bottom pan; and a crimped portion disposed near said perforations for preventing gravitational flow of condensate from said cover down into said depressed central portion.

2. A utensil generally as set forth in claim 1, said crimped portion being extended downwardly from the surface of said flange, and said perforations being positioned in said crimped portion.